W. H. HART.

CAMP OVEN.

APPLICATION FILED FEB. 3, 1909.

Reissued May 25, 1909.

12,961.

3 SHEETS—SHEET 1.

Witnesses

J. G. Sinkel

J. J. McCarthy

Inventor

William H. Hart

By Foster Freeman Watson & Coit

Attorneys

W. H. HART.

CAMP OVEN.

APPLICATION FILED FEB. 3, 1909.

Reissued May 25, 1909.

12,961.

3 SHEETS—SHEET 2.

Witnesses

J. G. Stinkel

J. J. McCarthy

William H. Hart

By Foster Freeman Watson & Coit

Attorneys

W. H. HART.

CAMP OVEN.

APPLICATION FILED FEB. 3, 1909.

Reissued May 25, 1909. 12,961.

3 SHEETS—SHEET 3.

Witnesses

J. G. Stinkel

J. J. McCarthy

Inventor

William H. Hart

By Foster Freeman Watson & Coit

Attorneys

UNITED STATES PATENT OFFICE.

WILLIAM H. HART, OF THE UNITED STATES ARMY, ASSIGNOR OF ONE-HALF TO HARRY B. LEARY, OF WASHINGTON, DISTRICT OF COLUMBIA.

CAMP-OVEN.

No. 12,961. Specification of Reissued Letters Patent. Reissued May 25, 1909.

Original No. 898,641, dated September 15, 1908, Serial No. 439,577. Application for reissue filed February 3, 1909. Serial No. 475,940.

*To all whom it may concern:*

Be it known that I, WILLIAM H. HART, major in the United States Army, stationed at Washington, District of Columbia, but temporarily of Aldershot, England, have invented certain new and useful Improvements in Camp-Ovens, of which the following is a specification.

The present invention is a portable oven which is adapted generally for outdoor use and particularly for baking bread or other foods in large quantities for military encampments.

The preferred form of the invention embodies an oven which can be taken apart and packed in small space for transportation. All parts of the oven are light and portable and if desired the oven can be easily transported without taking it apart. It will however be evident that for the particular purposes to which this oven is designed, its adaptability for being disconnected and packed in small space is quite important.

Figure 1:
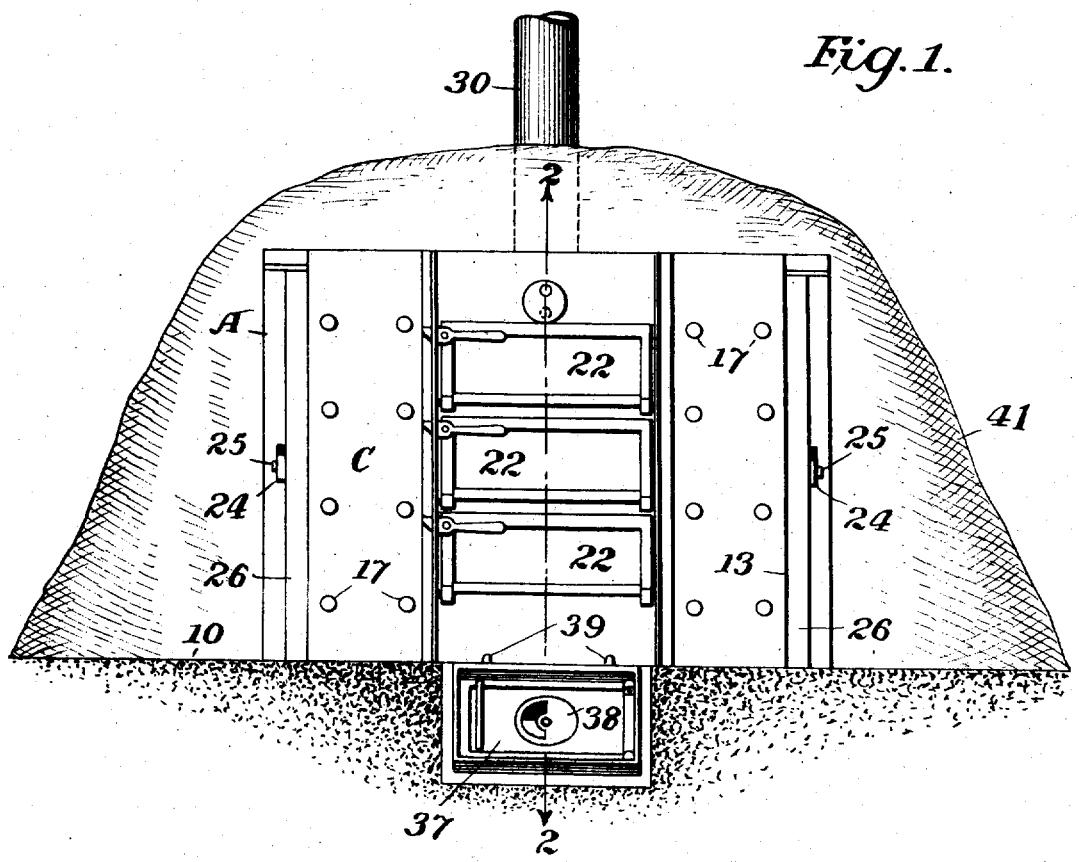
Figure 6:
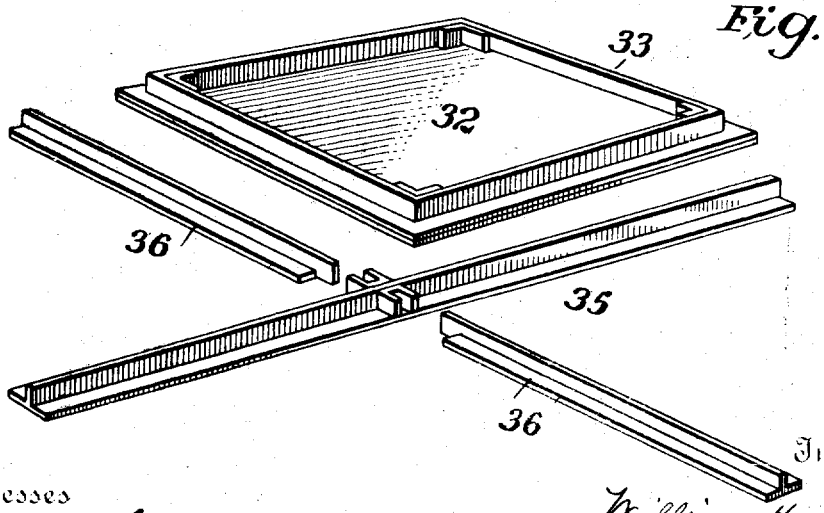
Figure 2:
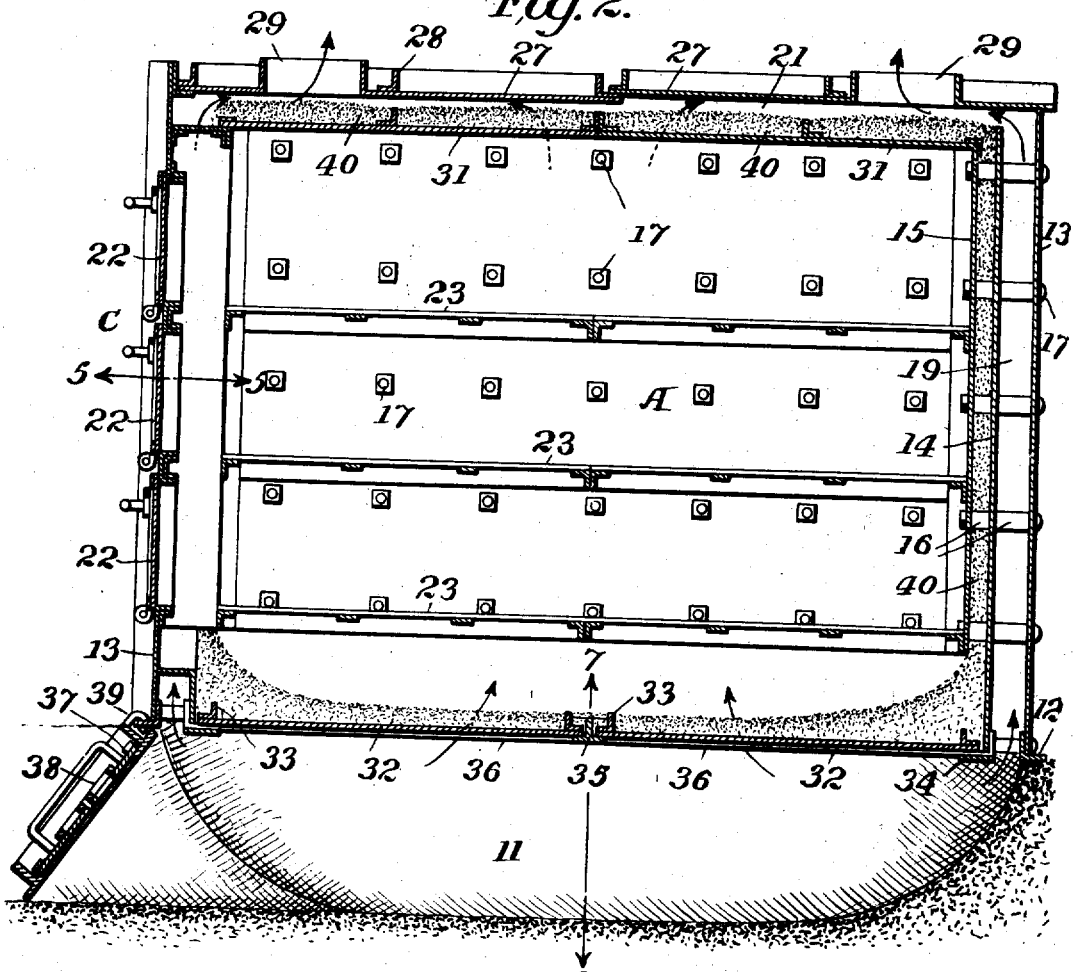
Figure 7:
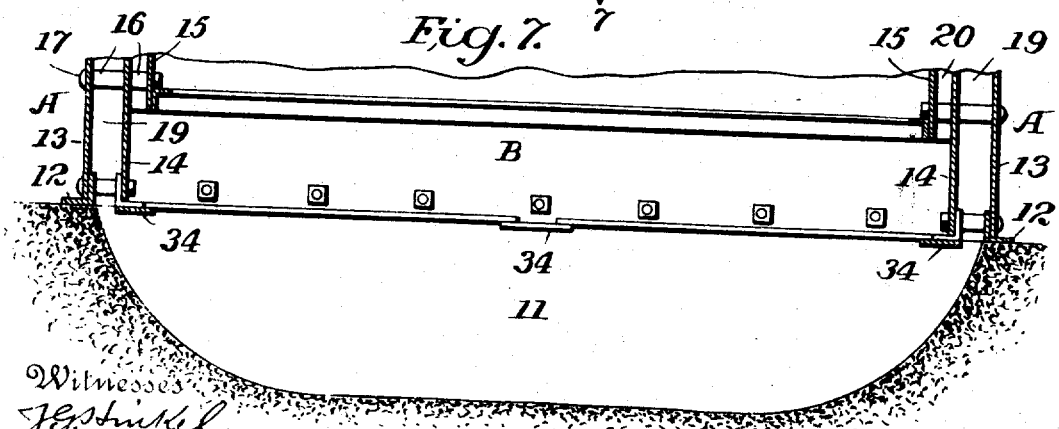
Figure 3:
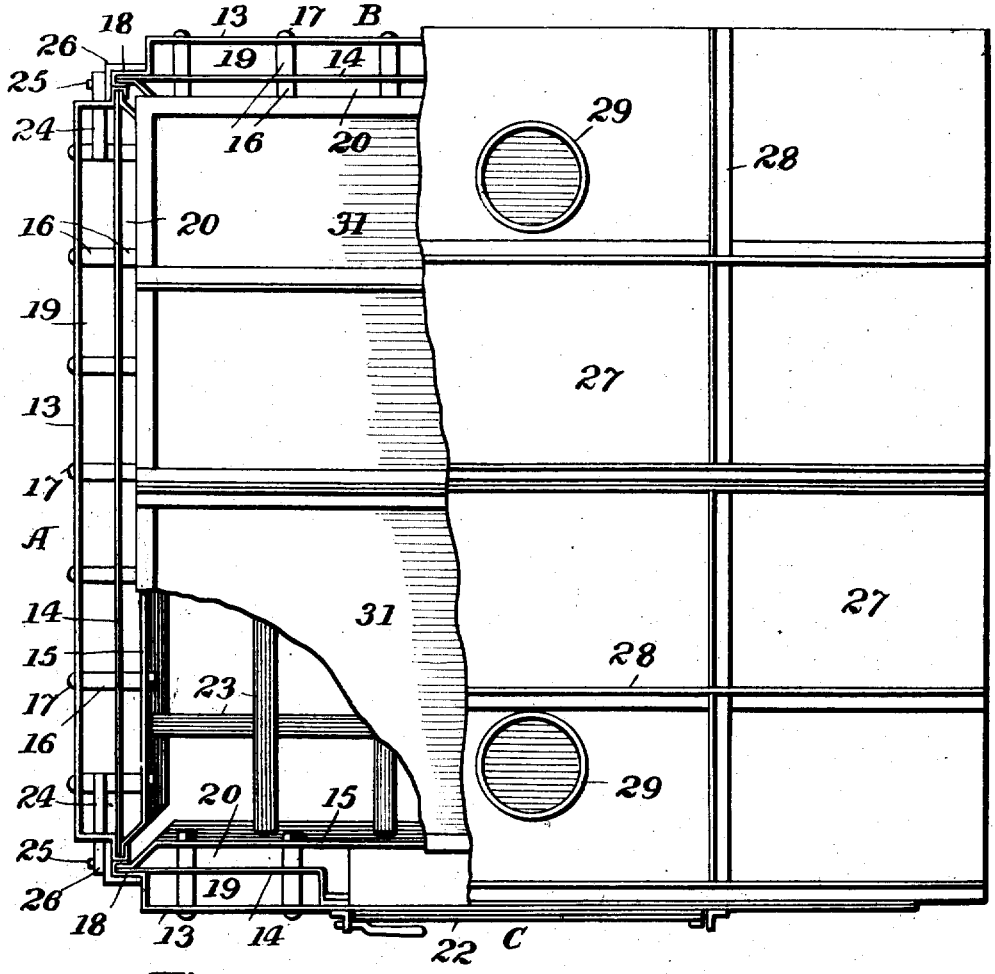
Figure 4:
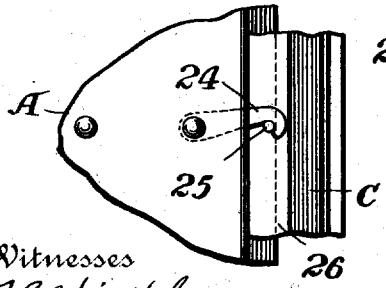
Figure 5:
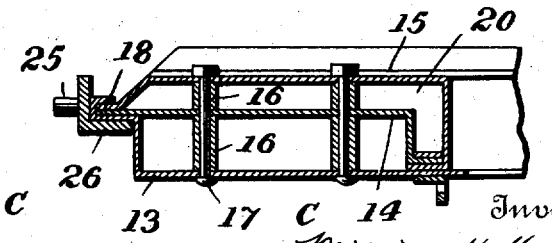

The invention will be described in connection with the accompanying drawing, in which, Figure 1 is a front view of the improved oven, the ground upon which it rests being shown in section on a vertical plane just in front of the oven; Fig. 2 is a vertical longitudinal section on the line 2 of Fig. 1, the earth covering the oven being omitted; Fig. 3 is a plan view, parts of the upper and lower top plates being broken away; Fig. 4, is a detail showing a form of latch for connecting the sides of the oven; Fig. 5 is a section on the line 5 of Fig. 2; Fig. 6 is a detail showing the supports for the bottom of the oven; and Fig. 7 is a section on the line 7 of Fig. 2.

The oven forming the subject of this invention is adapted to sit directly upon the ground and is not provided with any of the features of a stove excepting that a draft door is preferably used to control the draft. A shallow opening in the earth about as wide and as long as the oven, and deep enough to contain the fuel, serves the purpose of a stove for producing the necessary heat and the oven rests directly upon the ground at the margin of this opening. The oven is arranged so that the heat from the fire passes upward through hollow walls at the sides, back and front and across the top to one or more chimney openings or outlets for the gases.

The entire inner wall of the oven, top, bottom and sides, with the exception of the space for the oven doors, is protected from uneven heating, preferably by a filling or covering of earth or sand, which can be readily obtained, and the walls of the oven are thus uniformly heated, as is necessary for even baking.

Referring to the drawing, 10 indicates the surface of the earth and 11 a fire pit or shallow excavation conforming in area to the area of the bottom of the oven. The lower edges of the outer walls of the oven are preferably provided with flanges 12 adapted to rest on the edges of the pit and thus support the oven upon the surface of the earth.

The side walls A and rear walls B of the oven are preferably constructed as illustrated in Figs. 2 and 3, referring to which 13 indicates an outer wall, 14 an intermediate wall and 15 an inner wall. These walls are preferably constructed of sheet metal and they are spaced apart and connected together in any suitable manner. As shown particularly in Fig. 5, the walls are spaced apart by tubes 16 and connected by bolts 17 passing through the tubes. At the corners of the oven the outer, inner and intermediate walls are brought together and suitably connected, as shown at 18 in Figs. 3 and 5. Each of the sides of the oven and the back is thus an integral structure having an inclosed space 19 through which the hot gases circulate and an inclosed space 20 which is preferably filled with earth, sand or other suitable non-combustible material adapted to prevent overheating of the oven in spots and cause the heat to be uniformly distributed over its walls. As shown in Fig. 2, the flue space 19 in the vertical walls is open at the bottom to the fire pit and open at the top to an interspace 21 in the top of the oven. The heat may thus pass up through the spaces 19 uniformly on the back and sides of the oven.

The front C of the oven is preferably provided with a series of doors 22 for convenient access to the interior shelves 23. These doors may be of any suitable construction and are provided with latches or fastenings for keeping them closed while baking. On each side of the doors the front wall C is constructed in the same manner as the side walls, as shown in Fig. 5, and the same reference figures have been applied. When assembled the edges of the various walls are detachably connected at the corners of the oven, by some suitable means. As shown in the drawing, latches 24 are pivoted to the side walls and adapted to engage pins 25 which are fixed on the front and rear walls. The pins 25 are preferably connected to angle irons 26 which are attached to the front and rear walls and overlap the edges of the side walls. By the construction shown the four sides of the oven can be securely connected by a single latch at each corner.

The top of the oven consists of one or more outer plates 27 suitably stiffened by ribs 28 and provided with one or more flanged openings 29 to which ordinary stove pipes 30 may be readily connected. The top plates 27 may be simply laid on the upper edges of the outer walls 13 or may be suitably supported on brackets or flanges secured to said outer walls. The top is composed of inner and outer walls, the inner wall 31 being composed of plates of suitable strength resting on the inner vertical walls 15, as shown in Figs. 2 and 3. The intermediate walls 14 are preferably higher than the inner walls 15 and lower than the outer walls 13. The gases passing up through the flue spaces 19 are thus permitted to pass over the intermediate walls and over the top of the oven to the outlets 29. At the bottom of the oven the outer and intermediate walls extend preferably to the surface of the ground while the inner wall terminates at some distance above the surface level, as shown in Fig. 2. The bottom of the oven consists of suitable plates 32 supported by the intermediate walls of the oven approximately at the ground level. As shown in Figs. 2 and 6, the bottom consists of four plates 32 provided with stiffening flanges 33 and these plates are detachably supported upon flanges 34 connected to the intermediate walls 14, a bar 35 extending between the side walls and bars 36 supported at their inner ends by the bar 35 and at their outer ends by the front and rear walls of the oven respectively.

It will be understood that the fire pit 11 is closed on all sides by the earth, excepting for a narrow opening at the front which is preferably closed by a suitable door 37 which can be readily opened or removed for the purpose of inserting fuel and which is provided with a suitable draft opening and damper 38 for regulating the draft. As shown, the door is supported in place by hooks 39 which engage the lower edge of the front of the oven.

As shown particularly in Fig. 2, the inner wall of the top of the oven 31 is preferably covered with loose earth or sand 40 to prevent it from becoming burned out or overheated. The spaces 20 in the side, rear and front walls, are preferably filled with a similar substance and the bottom 32 is similarly covered. A sufficient amount of earth or sand or other suitable material may be placed in the bottom to support the material in the side walls and thus a continuous wall of the material 40 is formed over the entire surface of the oven excepting only the space in front occupied by the doors. The covering on the bottom 32 is preferably deeper than over the other walls as the bottom is subjected to the direct heat of the fire.

It will be understood that asbestos or other fire resisting material may be substituted for the earth or sand above referred to but a covering of the latter material is preferred as it may be thrown away when the oven is to be transported and replaced by new material of the same kind without expense when the oven is again set up. In some instances the oven might be used without any of the heat distributing material 40, the air in the spaces occupied by said material being relied upon, but the air is manifestly not so good, either to prevent uneven heating or burning of the walls as a covering of sand or similar material.

In order to prevent radiation of heat from the outer walls, the oven is preferably covered on top, sides and back with earth or sand 41, as illustrated in Fig. 1. A considerable amount of material is used in this covering and radiation from the walls of the oven may thus be almost entirely prevented. This earth embankment also assists in holding the sides and ends of the oven securely in place and it closes all of the joints at the corners. It has been demonstrated that an oven built as illustrated and described herein can be set up in camp and thoroughly heated ready for baking in about two hours.

In ovens of the class to which this invention appertains, it is very desirable that the walls should be as light as possible while at the same time providing the necessary flue space to permit the hot gases to pass through them. It is also desirable, although not always essential, that the walls should be detachably connected together in order that they may be taken apart and packed in small compass for transportation. The walls of the oven herein shown and described, are especially desirable on account of their lightness and the fact that they will stand the necessary heat for baking without material warping or twisting or distortion of the flues. These latter qualities are due to the fact that the several sheets of metal constituting each of the side walls A, the rear wall B, and the front wall C, are connected at frequent intervals throughout their area. It is particularly desirable that the plates or walls inclosing the flues or spaces 19 should be braced throughout their area and this bracing can best be performed by connecting the walls together at intervals as shown in the drawing. The particular devices shown and described for connecting the inner and outer walls of the flues are well adapted for the purpose, as has been demonstrated, but it will be evident that the plates which form the walls may be spaced apart and connected together in any suitable manner which will preserve their relative position. The parts constituting each wall section A, B, C, are permanently connected and each section may be handled as an integral piece of the oven structure. It is desirable in large apparatus that the wall-sections should be detachably connected, as heretofore described in order that they may be packed in small space for storage or transportation. In smaller apparatus, which is used largely for cooking purposes, it is not so essential that the sides be separable and in some instances they may be so connected that the oven may be transported bodily.

It will be evident that by omitting the earth covering from the top of the oven, the upper top plate can be used for cooking purposes, being then, in effect, the equivalent of the top of a stove. It will also be evident that this improved oven can be fired continuously and a second batch of bread placed in it as soon as the first is baked. In other words, the oven is of maximum capacity and can be used to supply bread and do other cooking for a large number of men.

Having described my invention, what I claim and desire to secure by Letters-Patent is, 1. A portable oven comprising an outer wall adapted to rest upon the ground at the margin of a fire pit, an intermediate wall supported by the outer wall, the space between said walls being adapted to receive and conduct the hot gases from the fire pit, an inner wall, a suitable bottom arranged over the fire pit, and a top having an interspace through which the gases pass to a suitable outlet.

2. A portable oven comprising an outer wall adapted to rest upon the margin of a fire pit, an intermediate wall, a bottom supported by the intermediate wall, an inner wall, a lower top plate supported by the inner wall and an upper top plate supported by the outer wall and provided with a suitable outlet, the hot gases being adapted to circulate from the fire pit between the outer and intermediate walls and between the upper and lower top plates to said outlet.

3. A portable oven comprising an outer wall adapted to rest upon the margin of a fire pit, an intermediate wall, a bottom supported by the intermediate wall, an inner wall, a lower top plate supported by the inner wall, an upper top plate supported by the outer wall, and a protecting layer of heat distributing material extending over the lower top plate, between the inner and intermediate walls, and over the bottom.

4. A portable oven comprising detachable sides, front back, top and bottom, the sides, front and back each having an outer wall adapted to rest upon the margin of a fire pit, an intermediate wall and an inner wall, the said walls being connected together at their vertical edges whereby separate heating flues are formed in the sides, back and front, and means for detachably connecting the sides, back and front.

5. An oven comprising side, front and rear walls detachably connected together and having flues for the passage of hot gases therethrough and a top having an interspace in communication with said flues in combination with a fire pit beneath said oven and upon the margin of which the oven rests, and a covering of earth or similar material over the sides, top and back of the oven, the said covering being adapted to retain the heat in the oven and close the joints thereof.

6. An oven comprising an inner wall, an intermediate wall extending above and below the inner wall, an outer wall extending above the intermediate wall, a lower top plate supported by the inner wall, a bottom supported by the intermediate wall, an upper top plate supported by the outer wall and a layer of earthy material extending continuously over the lower top plate, between the inner and intermediate walls, and over the bottom, whereby the heat passing from the fire pit upward through the flues between the intermediate and outer walls and between the lower and upper top plates is uniformly distributed over the oven.

7. A portable oven having inclosing wall sections, a top having an interspace, and a suitable bottom, certain of the wall sections each comprising an outer wall or plate adapted to rest upon the ground, a second wall or plate within and separated from the outer wall to form an intermediate flue, the said flue connecting at its lower end with the fire space under the oven and at its upper end with the interspace of the top to permit the hot gases to circulate upward through the flue to the top, and means connecting and mutually bracing said plates at intervals throughout their area.

8. A portable oven having inclosing wall sections, a top having an interspace, and a suitable bottom, certain of the wall sections each comprising an outer wall or plate adapted to rest upon the ground, a second wall or plate within and separated from the outer wall to form an intermediate flue, the said flue connecting at its lower end with the fire space under the oven and at its upper end with the interspace of the top to permit the hot gases to circulate upward through the flue to the top, and means connecting and mutually bracing said plates at intervals throughout their area, the wall sections, top and bottom being detachable to permit of compact arrangement for transportation.

9. A rectangular portable oven comprising side, back and front wall-sections, each of which includes a plurality of metal plates, with an intermediate flue having upper and lower openings, and a top having an interspace in communication with the upper openings of said flues, the adjacent plates of said wall-sections being connected throughout their area, for the purpose set forth.

10. A portable oven comprising an outer wall adapted to rest upon the ground at the margin of a fire pit, a second wall separated from the outer wall, the space between said walls being adapted to receive and conduct the hot gases from the fire pit, means connecting and mutually bracing said walls at intervals throughout their area, a suitable bottom arranged over the fire pit, and a top for said oven.

11. A wall section for a portable oven comprising an outer wall, an intermediate wall and an inner wall spaced apart, and means connecting and mutually bracing said walls at intervals throughout their area.

12. An oven comprising side, front and rear walls connected together and adapted to rest upon the margin of an open fire pit, and a plate closing the bottom of said oven above the fire pit, the said side walls being provided with vertical heating flues adapted to receive the products of combustion directly from the fire pit.

In testimony whereof I affix my signature in presence of two witnesses.

WILLIAM H. HART.

Witnesses:
H. D. JAMESON,
R. T. WILLIAMS.